United States Patent Office 3,215,710
Patented Nov. 2, 1965

3,215,710
PROCESS FOR THE PRODUCTION OF 1-HYDROXY - 4 - PHENYLAMINOANTHRAQUINONE COMPOUNDS
Peter Hindermann, Batterie, Basel, and Hans Peter Kolliker, Munchenstein, Basel Land, Switzerland, assignors to J. R. Geigy A.-G., Basel, Switzerland
No Drawing. Filed Jan. 4, 1962, Ser. No. 164,413
Claims priority, application Switzerland, Jan. 5, 1961, 92/61
9 Claims. (Cl. 260—380)

The present invention concerns a process for the production of 1-hydroxy-4-phenylaminoanthraquinone compounds, their use for the dyeing of polyester fibres as well as, as industrial product, the polyester fibres dyed by the use of these anthraquinone compounds.

1-hydroxy-4-phenylaminoanthraquinones have been described in the literature. They are obtained by reacting an aminobenzene with a 1,4-dihydroxyanthraquinone compound. It has been suggested, for example, that the reaction be performed in an organic solvent at relatively low temperatures, possibly with the addition of boric acid, or that it be performed by using a leuco compound of a 1,4-dihydroxyanthraquinone in the melt. Another suggestion concerns the reaction of an aminobenzene with a 1-hydroxy-4-halogen anthraquinone. The success of this reaction, in particular the reaction of an aminobenzene with a 1,4-dihydroxyanthraquinone compound in an organic solvent at relatively low temperatures, depends principally on the reactivity of the aminobenzene. Thus aminobenzenes the benzene nucleus of which is substituted in a position vicinal to the amino group, e.g., by alkyl groups, can either not be reacted at all according to the known processes with 1,4-dihydroxyanthraquinone or with 1-hydroxy-4-halogen anthraquinones to form the corresponding 1-hydroxy-4-phenylaminoanthraquinones, or else only very bad yields are obtained. The separation of the mixtures of 1-phenylamino- and 1,4-bis-phenylaminoanthraquinones obtained under the known conditions is difficult, time consuming and costly.

It has now surprisingly been found that substituted 1-hydroxy-4-phenylaminoanthraquinone compounds, the phenyl nucleus of which is substituted in a position vicinal to the amino group are obtained in good yields and purity if the mixture of a 1,4-dihydroxyanthraquinone of the general Formula I

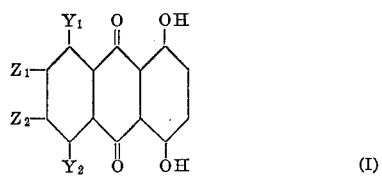

(I)

wherein each of $Y_1$ and $Y_2$ independently is H or OH,
each of $Z_1$ and $Z_2$ independently is H or halogen, especially chlorine with the limitation that in the above structural formula at least both $Y_1$ and $Y_2$ or both $Z_1$ and $Z_2$ must be hydrogens, and its corresponding leuco derivative with vicinally substituted aniline of the Formula II

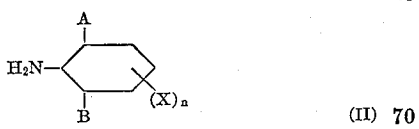

(II)

wherein

A is lower alkyl, especially alkyl having 1 to 3 carbon atoms or lower alkoxy, especially —$OCH_3$
B is halogen, especially Cl, lower alkyl, especially alkyl having 1 to 3 carbon atoms or lower alkoxy especially —$OCH_3$
X is lower alkyl, especially alkyl having 1 to 3 carbon atoms, and
n is one of the numerals 0 to 2.

is reacted to form an anthraquinone compound of the general Formula III

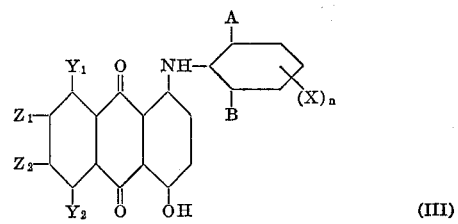

(III)

wherein $Y_1$, $Y_2$, $Z_1$, $Z_2$, A, B, X and n have the meanings given above, the reaction being performed at a raised temperature in the presence of a boric acid ester of a 1,3-diol or in the presence of components which can form such an ester.

In particularly valuable condensation products according to the invention, both A and B each represent a low alkyl group, in particular the methyl but also the ethyl group.

As further substituents of the benzene ring of the vicinally substituted aniline of Formula II lower alkyl groups preferably in the p-position, in particular the methyl or also ethyl group are employed.

In the preferred compounds according to the invention $Y_1$ and $Y_2$ as well as $Z_1$ and $Z_2$ each represent hydrogen. If $Z_1$ and $Z_2$ are each halogen then they represent principally chlorine.

Examples of starting materials of formula I are mainly: 1,4-dihydroxy-, 1,4,5-trihydroxy-, 1,4,5,8-tetrahydroxy-, 1,4-dihydroxy-6-chloro- or 1,4-dihydroxy-6,7-dichloro- anthraquinone.

Examples of vicinally substituted anilines are: 2,6-dimethyl-, 2,6-diethyl-, 2,6-dimethoxy-, 2-methyl-6-ethyl-, 2-methyl-6-chloro-, 2,4,6-trimethyl, 2,4,6-triethyl, 2,3,5,6-tetramethyl-, or 2,6-dimethoxy-4-methyl- 1-aminobenzene; 2,6 - dimethyl - 1 - amino-benzene and 2,4,6-trimethyl-1-aminobenzene are preferred.

The boric acid esters used according to the invention are derived from 1,3-diols which can also be further substituted. For example, the boric acid esters of the following 1,3-diols can be utilised: 1,3-propanediol, 1,3-butanediol, 1,3- and 2,4- pentanediol, 2-methyl-2,4-pentanediol, 2-ethyl-1,3-hexanediol, 2,2-dimethyl-1,3-propanediol, 2,2-diethyl-1,3-propanediol, 2 - ethyl-2-butyl-1,3-propanediol, 1,1,1-tri-(hydroxymethyl)-propane, 2-methoxy, 2-ethoxy-, 2-propoxy- or 2-butoxy-1,1,1-(trihydroxy-methyl)-ethane or -tetra-(hydroxymethyl)-methane ("pentaerithrite"), advantageously 2-methyl-2,4-pentanediol.

A preferred class of boric acid esters corresponds to the general formula IV

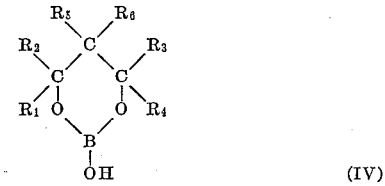

(IV)

wherein each of $R_1$, $R_2$, $R_3$, $R_4$ independently is H or lower alkyl, especially alkyl having 1 to 3 carbon atoms, and each of $R_5$ and $R_6$ independently is H, lower alkyl, especially alkyl having 1 to 4 carbon atoms or lower hydroxy alkyl, especially $CH_2OH$ The boric acid esters are obtained by heating a boric acid, such as ortho- or meta-boric acid or heating boric acid anhydride with one of the 1,3-diols mentioned above. They are white substances which crystallise well and have well defined melting points. Instead of these boric acids esters, the same results can be obtained by using the 1,3-diols with the boric acids mentioned or their anhydrides in which case any excess diol acts as solvent.

The mixture of 1,4-dihydroxyanthraquinone compound of Formula I and its leuco compound is condensed with the vicinally substituted aniline at raised temperatures, for example at 100–150° C., advantageously in excess aniline which serves as solvent at the same time. The proportion of leuco compound in the mixture of the two anthraquinones can be 20%–99%, preferably however, it is one-third to one-half. Advantageously amounts of 0.5 to 1.5 mols of boric acid esters of the Formula IV or their components are used, calculated on 1 mol of 1,4-dihydroxyanthraquinone.

The 1-hydroxy-4-phenylaminoanthraquinone compounds of Formula III are obtained from the reaction mixture by dilution of the mixture with an organic solvent for the aniline used, for example, methanol or ethanol when alkanols are used. They can easily be purified by recrystallisation. In the pure state they are brilliant, deeply coloured crystalline bodies.

They dissolve in hot organic solvents with pure violet to blue shades.

Finely distributed in aqueous dispersion in the presence of carriers such as, e.g. phenylphenol, they dye hydrophobic polyester fibres in very pure and light fast violet to blue shades when dyeing is performed at the boil or at temperatures of over 100° C. and under pressure. Hydrophobic polyester fibres which can be fast dyed with the dyestuffs according to the invention are mainly esters of terephthalic acid and polyvalent alcohols, e.g., esters of terephthalic acid and alkylene glycols or polyhydroxymethylbenzenes such as, say, p-dimethylolbenzene, thus, for example, the following marketed products: "Terylene" (ICI, Manchester, Great Britain), "Dacron" (Du Pont de Nemours, Wilmington, Del., U.S.A.), "Terital" (Rhodiatoce, Milan, Piazza Erculea 15), "Terlenka" (Aku, Arnhem, Holland), "Tergal" (Rhodiaceta, Lyons, France), "Trevira" (Farbwerke Hoechst, Germany) or "Kodel" (Eastman Kodak Chemicals, Inc., Kingsport, Tenn., U.S.A.).

However, they can also be used for the dyeing of lacquers and spinning masses as well as of intermediate products for the synthesis of other dyestuffs.

The following examples serve to illustrate the invention. The temperatures therein are given in degrees centigrade. Where not otherwise expressly stated, the parts are given as parts by weight. The relationship of parts by weight to parts by volume is as that of grammes to cubic centimetres.

*Example 1*

A mixture of 72.6 parts of 2,6-dimethyl-aniline, 12 parts of 1,4-dihydroxyanthraquinone, 12.1 parts of leuco-1,4-dihydroxyanthraquinone, 4.65 parts of orthoboric acid and 9.2 parts of 2-methyl-2,4-pentanediol are heated in an atmosphere of nitrogen, the temperature being raised to 130–135° within 1 hour and the water formed being distilled off. The reaction mixture is then kept for 24 hours under reflux at this temperature. The mixture is then cooled to 40–50° and diluted with 240 parts of methanol whereupon the condensation product precipitates as a dark powder. This is filtered off and purified by recrystallisation from n-butanol. The pure 1-hydroxy-4-(2',6'-dimethylphenylamino)-anthraquinone of the formula

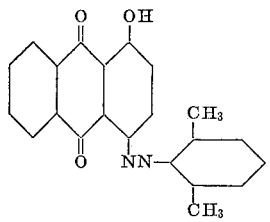

forms dark, brilliant crystals which melt at 188–189°. The compound dissolves in concentrated sulphuric acid with a blue colour, in pyridine and in a xylene mixture with a clear violet colour. When finely milled and mixed with a dispersing agent (alkylbenzene sulphonate), the condensation product dyes terephthalic acid polyester fibres, in particular in the presence of carriers such as phenylphenol, from aqueous dispersion in clear, reddish violet shades. The dyeings have very good fastness to light and industrial fumes.

*Example 2*

A mixture of 24 parts of 1,4-dihydroxyanthraquinone and 24.2 parts of leuco-1,4-dihydroxyanthraquinone are added while stirring to 170 parts of 2-methyl-6-chloraniline and the mixture is heated to 80°. At this temperature, 28.8 parts of boric acid ester, obtained by heating ortho-boric acid with 2-methyl-2,4-pentanediol, are added, the temperature is raised tto 130–135° and this temperature is maintained until no more 1,4-dihydroxyanthraquinone or leucoanthraquinone can be traced in the reaction melt. The reaction is completed after heating for 2 to 3 days. The reaction mixture, cooled to 90–95°, is poured into 600 parts of water and 140 parts of concentrated hydrochloric acid and the whole is stirred for half an hour at 90–95°. The precipitated reaction product is then filtered off. On repeated crystallisation from n-butanol, the 1-hydroxy-4-(2'-methyl-6'-chlorophenylamino)-anthraquinone of the formula

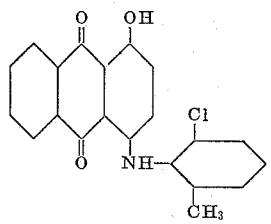

is obtained in the form of a dark, brilliant powder. It dissolves in concentrated sulphuric acid with a blue colour and in pyridine and a xylene mixture with a violet colour. Finely dispersed in the presence of an anion active dispersing agent and a phenolic carrier, it dyes terephthalic acid polyester fibres such as "Dacron" of E. I. du Pont de Nemours & Co., Wilmington, Delaware, U.S.A., in pure violet shades. The dyeings have good fastness to light and industrial fumes.

*Example 3*

A mixture of 12 parts of 1,4-dihydroxyanthraquinone, 12.1 parts of leuco-1,4-dihydroxyanthraquinone and 4.65 parts of ortho-boric acid is added while stirring to 81 parts of 2,4,6-trimethylaniline. 1.2 parts of 2-methyl-2,4-pentanediol are then added to this mixture and the whole is heated in an atmosphere of nitrogen at 110–115° while distilling off water. Condensation is then continued for 24 hours at this temperature under reflux. To complete the reaction, the temperature is raised to 130–135° and the whole is stirred at this temperature for 24 hours.

The 1-hydroxy-4-(2′,4′,6′-trimethylphenylamino)anthraquinone formed of the formula

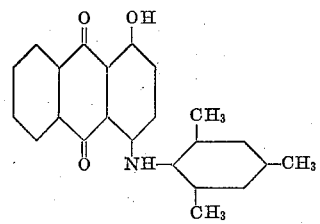

can be recognised by the intensive violet colouration of the reaction melt. The reaction mixture is then poured into hot water and dilute hydrochloric acid is added until Congo red paper is turned blue and excess 2,4,6-trimethyl-aniline is dissolved. The precipitate is filtered off and the anthraquinone compound formed is purified by recrystallisation from n-butanol. The 1-hydroxy-4-(2′,4′,6′ - trimethylphenylamino)-anthraquinone so obtained melts at 194–196°. It is a dark, coarsely crystalline powder which dissolves in concentrated sulphuric acid with a blue colour and in pyridine and in a xylene mixture with a clear violet colour. When milled with alkylbenzene sulphonate, the compound dyes polyester fibres from an aqueous dispersion in the presence of o-phenylphenol as carrier in clear, violet shades. The dyeings have excellent fastness to light and industrial fumes.

If in the above example, instead of 81 parts of 2,4,6-trimethylaniline, 106.2 parts of 2,4,6-triethylaniline, 89.4 parts of tetramethylaniline or 114.6 parts of 2,6-di-isopropyl-4-methylaniline are used, then dispersion dyestuffs are obtained by finely milling the condensation products, which dyestuffs dye polyester fibres in similar shades which have very good properties.

*Example 4*

A mixture of 81 parts of 2-methyl-6-ethylaniline, 10 parts of 1,4-dihydroxyanthraquinone. 14.1 parts of leuco-1,4-dihydroxyanthraquinone, 4.65 parts of ortho-boric acid and 10 parts of 2-methyl-2,4-pentanediol are heated in an atmosphere of nitrogen at 130–135°, the water being distilled off, and then refluxed for 30 hours at this temperature while stirring. The mixture, cooled to 50°, is then diluted with 300 parts of ethanol whereupon the condensation product precipitates as a powder after a few hours. It is filtered off and the dyebase is purified by repeated recrystallisation from sec. butanol. The pure 1 - hydroxy-4-(2′-methyl-6′-ethylphenylamine) - anthraquinone of the formula

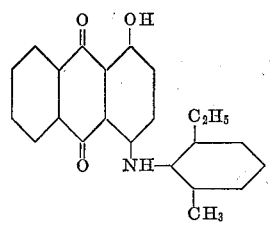

is a dark, brilliant crystal powder which dissolves in concentrated sulphuric acid with a blue colour and in pyridine and in acetone with a violet colour. Polyester fibres are dyed from an aqueous dispersion thereof in violet shades which have excellent fastness to light and industrial fumes. If in the above example the 81 parts of 2-methyl-6-ethylaniline are replaced by 114.6 parts of 2,4-diisopropyl-6-methylaniline, then a very similar violet dyestuff is obtained.

*Example 5*

14.4 parts of ortho-boric acid ester of 2-methyl-2,4-pentanediol are added to a mixture of 92 parts of 2,6-dimethoxyaniline, 12 parts of 1,4-dihydroxyanthraquinone and 12.1 parts of leuco-1,4-dihydroxyanthraquinone and the whole is heated to 130–135° C. This reaction temperature is maintained for 40 hours. The violet-coloured reaction mixture is then cooled to 80°, poured into sufficient dilute hydrochloric acid so that excess 2,6-dimethoxy-aniline is dissolved and the crude condensation product is filtered off. On repeated crystallisation from n-butanol, pure 1-hydroxy - 4 - (2′,6′-dimethoxyphenylamino)-anthraquinone is obtained of the formula

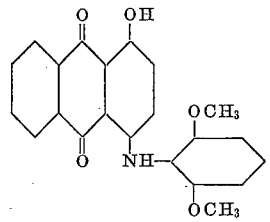

It is a dark, brilliant crystal powder. Dissolved in concentrated sulphuric acid it gives a blue and in pyridine a violet colour. Polyester fibres are dyed from an aqueous dispersion thereof in the presence of carriers such as o-phenylphenol in violet shades. The dyeings are remarkably fast to light and industrial fumes.

The boric acid ester used in the above example corresponds to the formula

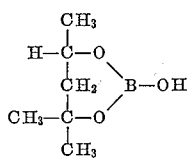

It is produced by heating 23.6 parts of 2-methyl-2,4-pentanediol with 12.36 parts of ortho-boric acid for 10 minutes at 98–105°. On cooling, the mixture solidifies into a crystal mass. The crystals can be purified by sublimation in vacuo at 50–55°. The sublimated boric acid is a white crystalline powder. On recrystallisation from water, the ester is obtained as pure white crystals which melt at 74–76°.

Calculated: C=50.06%; H=9.03%. Found: C=50.28%; H=8.78%.

Boric acid esters having similar action are also obtained if 15.2 parts of 1,3-propanediol, 26.4 parts of 2,2-diethyl-1,3-propanediol, 20.8 parts of 2,2-dimethyl-1,3-propanediol, 18 parts of 1-methyl-1,3-propanediol, 32 parts of 2-ethyl-2-butyl-1,3-propanediol or 29.2 parts of 2-ethyl-1,3-hexanediol are condensed at 100–110° with 12.36 parts of ortho-boric acid.

*Example 6*

A mixture of 13.6 parts of 1,4,5,8-tetrahydroxyanthraquinone, 13.7 parts of leuco-1,4,5,8-tetrahydroxyanthraquinone and 14.4 parts of the boric acid ester described in Example 5 is added while stirring to 74.3 parts of 2,4,6-trimethyl-aniline. The mixture is heated within 40 minutes to 130–135° and the condensation water is distilled off in an atmosphere of nitrogen. As soon as 135° has been attained, the mixture is refluxed for another 24 hours. The melt is then cooled to 60°, 300 parts of ethanol are added, the precipitated product is filtered off and purified by recrystallisation from n-butanol. The condensation product of the formula

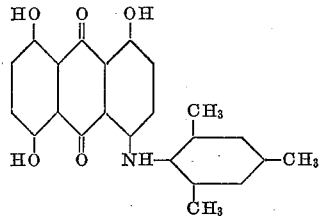

is a dark, brilliant crystal powder. It dissolves in concentrated sulphuric acid with a greenish blue colour and in pyridine and in a xylene mixture with a blue colour. Polyester fibres are dyed from an aqueous dispersion thereof in the presence of o-phenylphenol as carrier in blue shades. The dyeings have good fastness to light and industrial fumes.

If, instead of the 13.6 parts of 1,4,5,8-tetrahydroxy-anthraquinone or 13.7 parts of leuco-1,4,5,8-tretrahy-droxyanthraquinone, a mixture of 12.8 parts of 1,4,5-trihydroxyanthraquinone and 12.9 parts of leuco-1,4,5-trihydroxyanthraquinone is used, then a compound having similarly good properties is obtained.

*Example 7*

81 parts of 2,4,6-trimethyl-aniline are added to a mixture of 15.45 parts of 6,7-dichloro-1,4-dihydroxyanthraquinone and 15.55 parts of leuco-6,7-dichloro-1,4-dihydroxyanthraquinone and the whole is heated to 90°. 15 parts of the boric acid ester described in example 5 are added to this mixture and the whole is brought to a temperature of 130–135° within 1 hour while distilling off the condensation water in an atmosphere of nitrogen. As soon as 135° has been attained, the mixture is re-fixed for 24 hours. It is then cooled to 50°, 300 parts of methanol are added, the precipitated crude product is filtered off and purified by recrystallisation from n-butanol. It corresponds to the formula

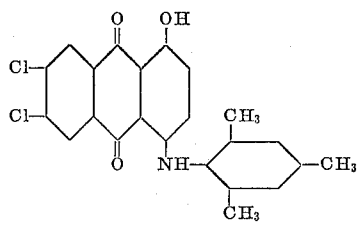

It dissolves in concentrated sulphuric acid with a blue and in pyridine with a violet colour. The violet dyeings obtained on polyester fibres with this dyestuff have good fastness to light and industrial fumes.

If, instead of the mixture given above of 15.45 parts of 6,7-dichloro-1,4-dihydroxyanthraquinone and 15.55 parts of leuco-6,7-dichloro-1,4-dihydroxyanthraquinone, a mixture of 13.7 parts of 6-chloro-1,4-dihydroxyanthraquinone and 13.8 parts of leuco-6-chloro-1,4-dihydroxyanthraquinone is used, then a compound having similarly good properties is obtained.

*Example 8*

A mixture of 12 parts of 1,4-dihydroxyanthraquinone, 12.1 parts of leuco-1,4-dihydroxyanthraquinone, 4.65 parts of ortho-boric acid and 13.6 parts of pentaerythrite is added while stirring to 81 parts of 2,4,6-trimethyl-aniline. The temperature is raised to 135–140° while distilling off water and then the reaction mixture is condensed under reflux for 48 hours at this temperature. The reaction mass is worked up as described in example 3 whereupon 1-hydroxy - 4-(2',4',6'-trimethylphenylamino) - anthraquinone of the same purity is obtained.

*Example 9*

For dyeing terephthalic acid polyglycol esters, 2 parts of the anthraquinone compound produced according to Example 3 or Example 8 are finely ground with 2 parts of the sodium salt of dodecylbenzene sulphonic acid and the whole is dispersed in 4000 parts of water.

12 parts of the sodium salt of o-phenylphenol, and 12 parts of diammonium phosphate are added to this solution and the polyester fabric is dyed for 1½ hours at 95–98°. The dyeing is rinsed and thoroughly washed with dilute caustic soda lye and a dispersing agent.

In this way a violet dyeing is obtained which is fast to light, washing and industrial fumes.

Similarly good dyeings are obtained in the same manner with the other 1-hydroxy-4-phenyl-aminoanthraquinone compounds described in the examples.

*Example 10*

2 parts of the finely distributed anthraquinone compound obtained according to Example 1 are suspended in 4000 parts of water which contains 2 parts of synthetic anion active dispersing agent. The pH of the dyebath is adjusted to 6.5 with acetic acid.

100 parts of polyester fabric are entered at 40°, the bath is heated within 15 minutes in an autoclave to 130° and kept for 45 minutes at this temperature. The dyeing is rinsed with water and saponified. A clear violet dyeing is obtained which is fast to light and industrial fumes.

The other 1-hydroxy-4-phenylamino - anthraquinone compounds described in the examples can be used in the same way for the dyeing of polyester fibres. Equally valuable clear violet dyeings are obtained.

What is claimed is:
1. Process for making 1-hydroxyphenylamino anthraquinones comprising
   (a) reacting at a temperature of about 100° to 150° C. a mixture of compound of the formula

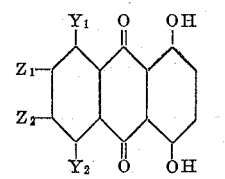

and, frrom 20 to 99% by weight, calculated on the total weight of said mixture, of the leuco compound of the compound of formula I, with a compound of the formula

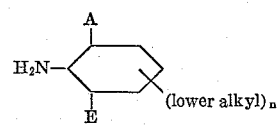

in the presence of boric acid ester of the formula

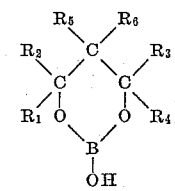

and
   (b) recovering from the resultant admixture compound of the formula

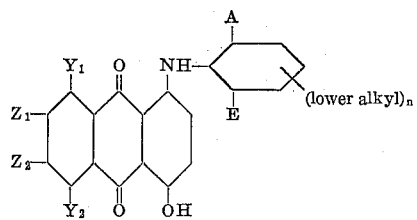

wherein
   $Y_1$ and $Y_2$ are independently members selected from the group consisting of hydrogen and hydroxy,
   $Z_1$ and $Z_2$ are independently members selected from the group consisting of hydrogen and chlorine, both members of one of the pairs $Y_1$ and $Y_2$, and $Z_1$ and $Z_2$ being hydrogen atoms,
   A is a member selected from the group consisting of lower alkyl and alkoxy,
   E is a member selected from the group consisting of chlorine, lower alkyl and lower alkoxy,
   n is an integer from 0 to 2,
   $R_1$, $R_2$, $R_3$, $R_4$ are, independently, members selected from the group consisting of hydrogen and lower alkyl, and $R_5$ and $R_6$ are, independently, members selected from the group consisting of hydrogen, lower alkyl and lower hydroxyalkyl.

2. Process of claim 1 wherein said leuco compound is about 33 to 50% by weight of said mixture.

3. Process of claim 1 wherein said boric acid ester is 0.5 to 1.5 mols per mole of 1,4-dihydroxyanthraquinone.

4. Process for making 1-hydroxy-4-phenylaminoanthraquinone compounds of the formula

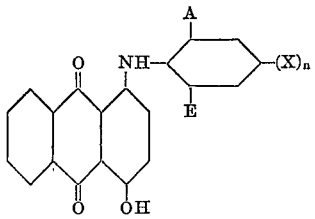

which comprises (1) reacting at a temperature of about 100° to 150 C. and in the presence of the ortho-boric acid ester of 2-methyl-2,4-pentanedoil, a mixture of 1,4-dihydroxyanthraquinone and, from about 20 to 99% by weight of said mixture, leuco compound of the aforesaid dihydroxyanthraquinone, with compound of the formula

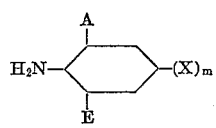

wherein

A, E and X are, independently, lower alkyl radicals having 1 to 2 carbons and $m$ is one of the numerals 0 and 1, and (2) recovering from the resultant admixture said compound of 1-hydroxy-4-phenylaminoanthraquinone.

5. Process for making phenylaminoanthraquinone of the formula

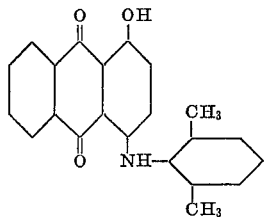

which comprises (1) reacting a mixture of 1,4-dihydroxyanthraquinone and, from about 20 to 99% by weight of said mixture, leuco compound of the aforesaid dihydroxyanthraquinone with 1-amino-2,6-dimethylbenzene, the reaction effected at a temperature of about 100° to 150° C. and in the presence of the ortho-boric acid ester of 2-methyl-2,4-pentanediol, and (2) recovering from the resultant admixture said aforementioned phenylaminoanthraquinone.

6. Process for making phenylaminoanthraquinone of the formula

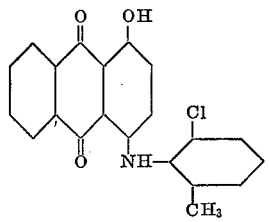

which comprises (1) reacting a mixture of 1,4-dihydroxyanthraquinone and, from about 20 to 99% by weight of said mixture, leuco compound of the aforesaid dihydroxyanthraquinone with 1-amino-2-methyl-6-chlorobenzene, the reaction being effected at a temperature of about 100° to 150° C. and in the presence of the ortho-boric acid ester of 2-methyl-2,4-pentanediol, and (2) recovering from the resultant admixture said aforementioned phenylaminoanthraquinone.

7. Process for making phenylaminoanthraquinone of the formula

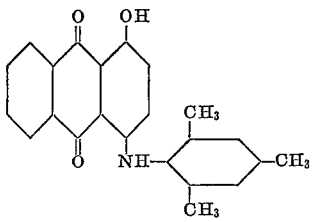

which comprises (1) reacting a mixture of 1,4-dihydroxyanthraquinone and, from about 20 to 99% by weight of said mixture, leuco compound of the aforesaid dihydroxyanthraquinone with 1-amino-2,4,6-trimethyl-benzene, the reaction being performed at a temperature of about 100° to 150° C. and in the presence of the ortho-boric acid ester of 2-methyl-2,4-pentanediol, and (2) recovering from the resultant admixture said aforementioned phenylaminoanthraquinone.

8. Process for making phenylaminoanthraquinone of the formula

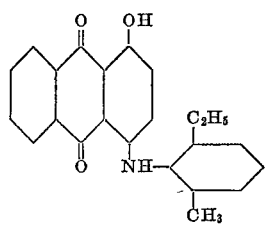

which comprises (1) reacting a mixture of 1,4-dihydroxyanthraquinone and, from about 20 to 99% by weight of said mixture, leuco compound of the aforesaid dihydroxyanthraquinone with 1-amino-2-methyl-6-ethyl-benzene, the reaction being effected at a temperature of about 100° to 150° C. and in the presence of the ortho-boric acid ester of 2-methyl-2,4-pentanediol, and (2) recovering from the resultant admixture said aforementioned phenylaminoanthraquinone.

9. Process for making phenylaminoanthraquinone of the formula

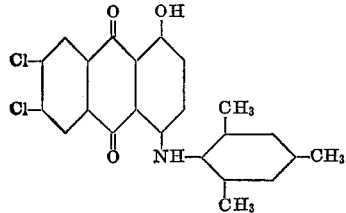

which comprises (1) reacting a mixture of 6,7-dichloro-1,4-dihydroxyanthraquinone and, from about 20 to 99% by weight of said mixture, leuco compound of the aforesaid dihydroxyanthraquinone with 1-amino-2,4,6-trimethyl-benzene, the reaction being performed at a temperature of about 100° to 150° C. and in the presence of the ortho-boric acid ester of 2-methyl-2,4-pentanediol, and (2) recovering from the resultant admixture said aforementioned phenylaminoanthraquinone.

References Cited by the Examiner
UNITED STATES PATENTS

| | | | |
|---|---|---|---|
| 2,419,405 | 4/47 | Klein | 260—380 |
| 2,777,863 | 1/57 | Dickey et al. | 260—380 |

LORRAINE A. WEINBERGER, *Primary Examiner.*

CHARLES B. PARKER, *Examiner.*